(No Model.)
J. C. SCHUMAN.
MANUFACTURE OF STARCH.
No. 341,282. Patented May 4, 1886.
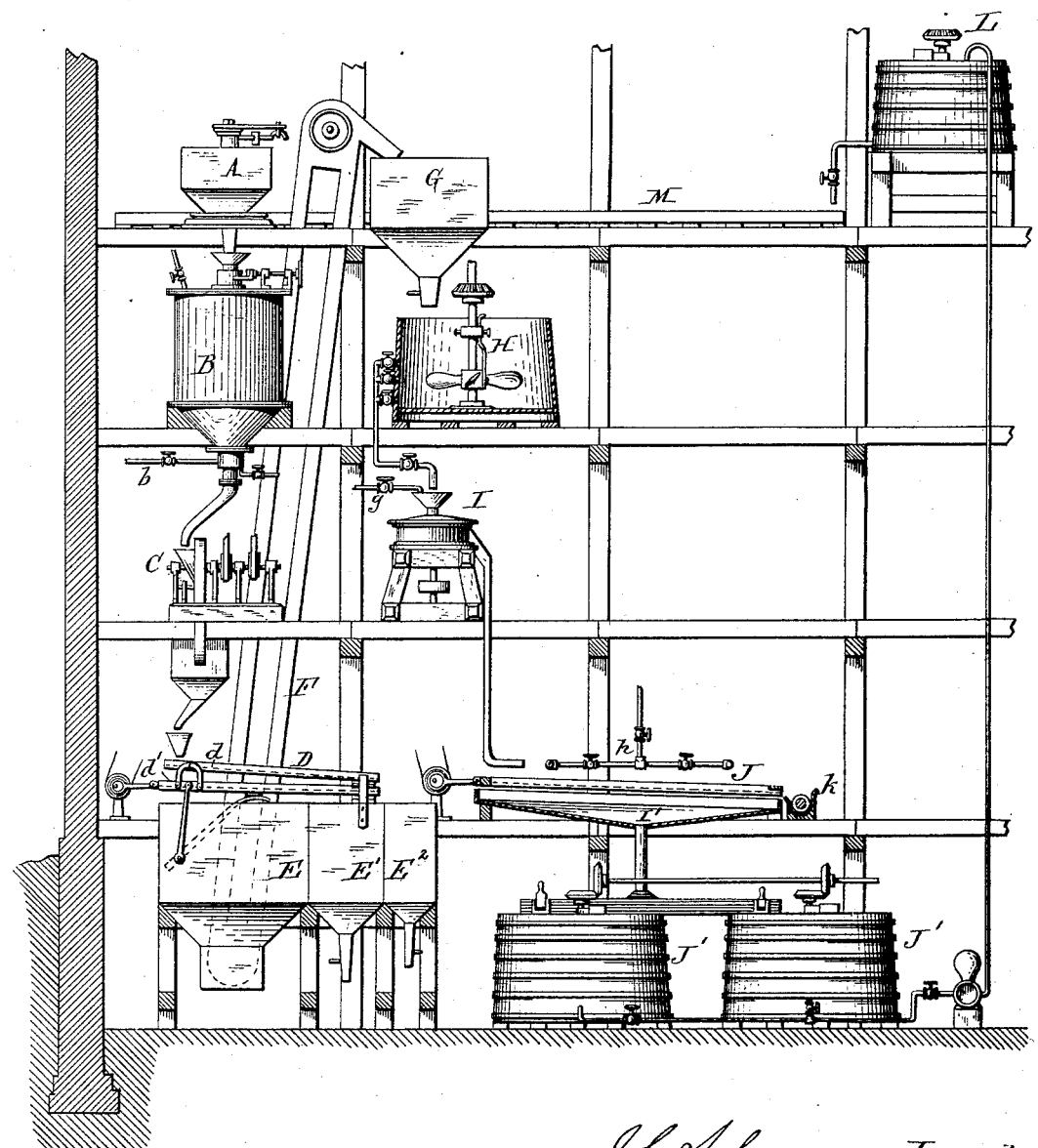

UNITED STATES PATENT OFFICE.

JOHN C. SCHUMAN, OF AKRON, ASSIGNOR TO WILLIAM T. JEBB, OF BUFFALO, NEW YORK.

MANUFACTURE OF STARCH.

SPECIFICATION forming part of Letters Patent No. 341,282, dated May 4, 1886.

Application filed January 21, 1886. Serial No. 189,260. (No model.)

*To all whom it may concern:*

Be it known that I, JOHN C. SCHUMAN, of Akron, in the county of Erie and State of New York, have invented a new and useful Improvement in the Manufacture of Starch, of which the following is a specification.

This invention relates to an improvement in that method of extracting starch from grain, more especially Indian corn or maize, in which the grain is first steeped and then reduced in such manner that the starch-particles or starch-meal can be separated from the fragments of hulls and germs by sifting.

The object of this invention is to expedite the operation of steeping or softening the corn preparatory to reducing the same and to facilitate the subsequent treatment of the corn, by which the impurities are removed from the starch.

My invention consists, to that end, in the method of steeping or softening the grain by exposing the same to the action of steam or watery vapor, as will be hereinafter fully set forth, and pointed out in the claims.

The accompanying drawing represents a plant of machinery by which my invention can be practiced.

A represents the weigh-hopper or charger, which receives the Indian corn or maize, and from which the grain passes to the steep-tank B. The latter is constructed of iron, wood, or other suitable material, and practically closed at the top, although it is preferably provided with a suitable vent-pipe or opening, through which the air and the excess of steam or vapor escapes.

The corn placed in the tank B is exposed in the same to the action of steam or watery vapor, which is admitted to the tank B through a pipe, $b$. The steam or vapor permeates the mass of corn contained in the tank B and softens the outer portions of the kernels, consisting, principally, of the hulls, germs, and glutinous linings lying between the hulls and the inner starchy bodies, without greatly affecting the starch. The outer portions of the kernels are so softened in a comparatively short time, owing to the combined effect of the heat and moisture of the steam or vapor, and when this has been accomplished the supply of steam or vapor is shut off from the tank B, and the corn is cooled either in the tank or after discharging it therefrom.

C represents a reducing-machine, which receives the steeped corn, and in which the corn is reduced in such manner that the starchy portions of the kernels or starch-meal can be separated from the hulls and germs or coarse offal by the subsequent sifting operation. I prefer for this purpose a machine which consists of several concentric rows of beaters revolving at a high speed in opposite directions within an inclosing-case, and whereby the grain is whipped or beaten. By the operation of this machine the hulls and their glutinous linings are opened and stripped or detached in large flakes from the inner starchy bodies of the kernels and from the germs, the starchy bodies being at the same time reduced to a meal and the germs either left unbroken or reduced to coarse fragments, so that the starch-meal can be easily separated from the germs and hulls by sifting. While I prefer to employ a whipping or beating machine for this primary reduction, any other suitable reducing-machine may be employed for this purpose—for instance, a disk-mill in which one of the disks has an eccentric movement with reference to the other, or a roller-mill; but none of these effects the desired reduction so completely and advantageously as the beating or whipping machine first mentioned.

D represents a screen-separator, whereby the starch-meal is separated from the fragments of hulls and germs, the starch-meal passing to a receiver, E, the germs to a receiver, E', and the hulls to a receiver, E². The separator which I prefer to employ for this purpose consists of an upper coarse screen, $d$, and a lower fine screen, $d'$, as described and shown in Letters Patent of the United States, No. 334,090, granted to me January 12, 1886. The starch-meal passes through the coarse screen $d$, and the finely-clothed head portion of the lower fine screen, $d'$, into the receiver E, the germs pass through the upper screen, $d$, and the coarsely-clothed tail portion of the lower screen, $d'$, into the receiver E', and the fragments of hulls tail off from both screens $d\ d'$ into the receiver E². Any other suitable separator by which the starch-meal is separated from the coarse offal may be employed, if desired.

F represents an elevator, whereby the separated starch-meal is elevated from the receiver E to a receiver, G, in the upper part of the building.

H represents a steep-vat, which receives the starch-meal from the receiver G, and in which the starch-meal is steeped for a sufficient length of time to completely open the granules or aggregations of starch-cells, and thus prepare the starch-meal for the final reducing or regrinding operation.

The temperature of the steep-water and the duration of the period of steeping may be varied in accordance with the conditions of each case and as the judgment of the operator may deem expedient.

The steep-vat is preferably provided with an agitator for thoroughly mixing the steep-water with the starch-meal.

I represents a mill, which receives the steeped starch-meal, and in which the starch-meal is reground, preferably with water, which is supplied to the mill by a pipe, $g$. I prefer for this purpose a burr or disk mill, such as is usually employed for the reduction of corn in the manufacture of starch by the wet process; but any other suitable reduction-machine may be employed for the purpose. The steeped starch-meal is reduced in this mill to a high degree of fineness, and any impurities—such as fine fragments of hulls, gluten, or germs which may have adhered to the starchy fragments—are completely detached from the same, and the starch is thoroughly mixed with the water, forming a starch-milk of uniform density.

J represents a separator, which receives the starch-milk from the mill I, and by which the remaining impurities are separated from the starch-milk. I prefer to employ for this purpose a separating-sieve, which is covered with bolting-cloth of the proper mesh to permit the starch-milk to pass through while the impurities tail off. This separation is facilitated by sprays of water, which are delivered upon the screen from perforated pipes $h$.

The starch-milk is collected in a gutter or trough, I', underneath the sieve and conducted to the settling-vats J', while the offal is collected in a trough, $k$, and removed to a suitable receptacle. The starch-milk so obtained may now be treated in any suitable or well-known manner, as may be necessary, to obtain the desired ultimate product. For instance, when it is desired to obtain starch suitable for the manufacture of commercial starch or for conversion into grape-sugar or glucose, the starch may be permitted to settle in the vats J', from which the water is drawn off from above the deposited starch. Fresh water is then mixed with the deposited starch and a solution of caustic alkali added, in the proportion of about one-eighth of a pound of alkali to the product from one bushel of grain, the alkaline solution weighing about $2\frac{1}{2}°$ Baumé.

This alkaline solution is thoroughly mixed with the starch-milk by the agitators with which the vats J' are provided, and water is added until the gravity of the mixture is reduced to about $3°$ Baumé. The liquid is next pumped to a receiving-tank, L, and passed from the latter to inclined tables or runs M, upon which the starch is deposited, while the refuse runs off; or the starch may be deposited out of the liquid in vats or tanks. The deposited starch may then be washed to remove all remaining traces of alkali or other impurities until a product of the desired purity is obtained.

The operation of obtaining the starch from the starch-milk may be modified in many ways, as the judgment of the operator and the character of the desired ultimate product may render advisable.

The hulls and germs which are separated from the starch-meal may be subjected to a second reducing operation, similar to the first, whereby the starch-particles which may adhere to the hulls and germs are detached therefrom, and these starch-particles may be recovered by a suitable sifting operation and added to the starch-meal before the latter is steeped.

In this method of extracting starch from grain the outer portions of the kernels are rapidly softened, thereby materially reducing the duration of the first steeping operation and reducing the liability of the grain to sour or ferment. The grain is effectually prepared by this first steeping or softening operation for the subsequent reduction, so that the hulls, germs, and glutinous linings of the kernels are easily detached from the starchy bodies. The second steeping operation, to which only the starch-meal is subjected, may be extended until the starch-particles have become completely softened or opened, so that the subsequent grinding operation will reduce all of the starch to a uniform degree of fineness and produce a starch-milk of uniform density, which contains, practically, all of the starch contained in the grain, thereby insuring a large yield. The second steeping operation is not liable to cause the starch to sour or ferment, as the bulk of the gluten, germs, and other deleterious ingredients are removed before the starch-meal is steeped. The hulls and germs are separated from the starch in a comparatively dry state, and can be advantageously used as cattle-feed, either fresh or after being dried, which can be accomplished at small expense.

I claim as my invention—

1. The herein-described method of extracting starch from grain, which consists in softening the kernels by the action of steam or watery vapor, then reducing the grain, and then separating the starch-meal from the coarse offal, substantially as set forth.

2. The herein-described method of extracting starch from grain, which consists in softening the kernels by the action of steam or watery vapor, then reducing the grain, then separating the starch-meal from the coarse offal, then steeping the separated starch-meal, then grinding the steeped starch-meal, and then separating the remaining impurities from the starch, substantially as set forth.

3. The herein-described method of extracting starch from grain, which consists in softening the kernels by the action of steam or watery vapor, then reducing the grain by whipping or beating, and then separating the starch-meal from the hulls and germs by sifting, substantially as set forth.

4. The herein-described method of extracting starch from grain, which consists in softening the grain by the action of steam or watery vapor, then reducing the grain by whipping or beating, then separating the starch-meal from the hulls and germs by sifting, then steeping the separated starch-meal, then grinding the steeped starch-meal, and then removing the remaining impurities from the starch, substantially as set forth.

Witness my hand this 18th day of January, 1886.

JOHN C. SCHUMAN.

Witnesses:
   EDWARD WILHELM,
   OSCAR SCHAUB.